United States Patent Office 3,386,229
Patented June 4, 1968

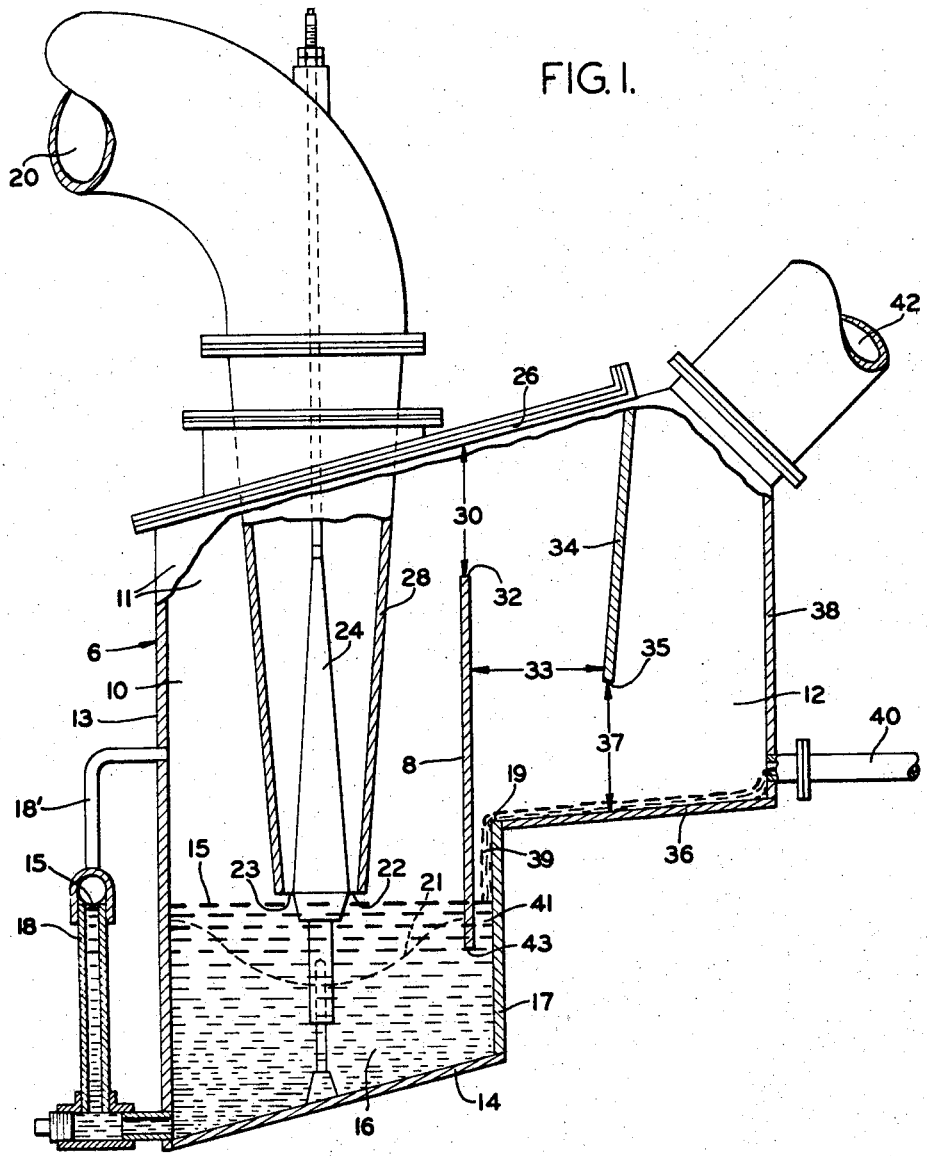
FIG. I.
INVENTOR:
LEO O. REED
BY
*E. Wallace Brewster*
ATTORNEY

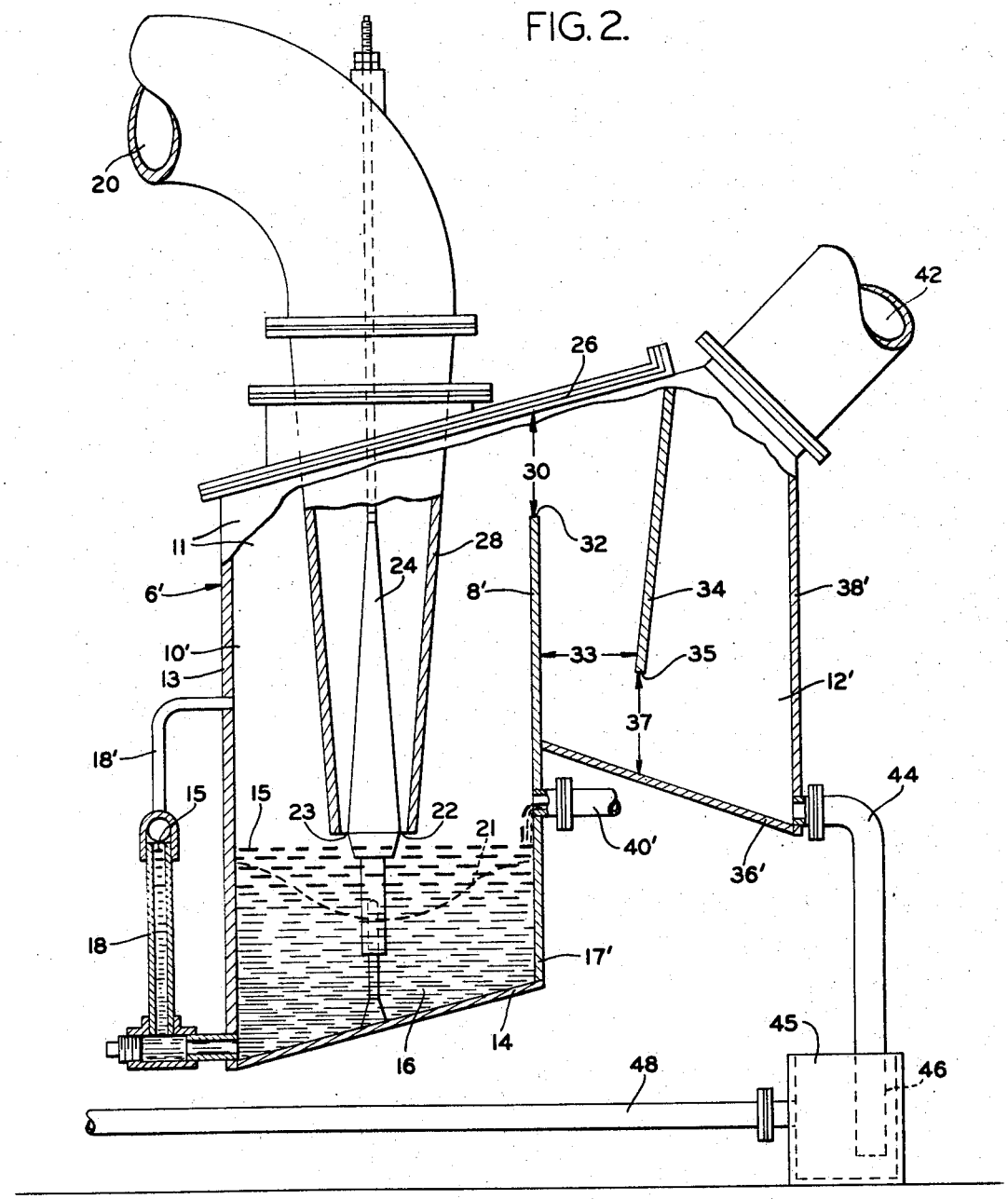

3,386,229
APPARATUS AND METHOD FOR
TREATMENT OF GASES
Leo O. Reed, Covina, Calif., assignor to Joy Manufacturing Company, Pittsburgh, Pa., a corporation of Pennsylvania
Continuation of application Ser. No. 101,826, Apr. 10, 1961. This application July 22, 1965, Ser. No. 477,634
4 Claims. (Cl. 55—227)

This application is a continuation of application Ser. No. 101,826 filed Apr. 10, 1961, now abandoned.

This invention relates to an apparatus and method for treatment of industrial gases and more particularly relates to the separation of finely divided particles of solid material entrained therein.

U.S. Patent No. 2,621,754 issued Dec. 16, 1952 discloses a method and apparatus for separating suspended particles of matter from industrial gases in which a stream of gas, having finely divided solid particles entrained therein, is discharged downwardly at high velocity into a bath of scrubbing liquid, whereby the suspended solids are driven into and retained by the scrubbing liquid. The surface of the scrubbing liquid being violently agitated breaks up into a multiplicity of minute droplets forming a liquid spray, which, being entrained within the stream of gas, must subsequently be separated therefrom. For further details of this method and apparatus, reference may be made to the hereinabove cited U.S. patent. In a well known commercial embodiment of the above cited patent the functions of that invention are accomplished in a container divided into separate portions by a baffle. A front portion into which the stream of gas is first introduced contains the body of scrubbing liquid hereinabove mentioned and it is here that the spray formation and entrainment of the dust particles in the liquid takes place. A second portion of the container called the back bay, performs the function of separating the liquid spray from the gas stream, by allowing the droplets to coalesce, forming a body of liquid on the floor of the back bay. It has been found that a major portion of the dust particles removed from the gas stream by entrainment in the scrubbing liquid are forced by the extreme agitation of liquid in the splash tank to travel over and under the baffle while suspended in the liquid and there settle out of the bath of semi-stagnant liquid in the back bay, forming a sludge which must be periodically cleaned out, with consequent interruption in the operation of the apparatus. If the sludge is not cleaned out, the suspended solid particles settle on the bottom of the back bay raising the level of the collecting liquid and impairing the cleaning efficiency of the apparatus, because of liquid spray with entrained solid particles passing completely through the apparatus.

The present invention comprises method and apparatus effective in preventing the accumulation of the dust particles in the form of sludge or solid deposits on the floor of such a back bay by continuously draining off a liquid in which the particles are suspended.

Accordingly, an object of this invention is to provide a new and improved apparatus and method for treatment of gases having means whereby entrained finely divided solid particles removed from a stream of such gases will be substantially continuously removed from the apparatus.

A further object of this invention is to provide a new and improved apparatus and method for treatment of gases whereby entrained finely divided solid particles removed from a stream of such gases can be prevented from forming an accumulative deposit, assuring substantially continuous operation of the apparatus.

A more specific object of this invention is to provide a new and improved apparatus and method for treatment of gases whereby entrained finely divided solid particles removed from a stream of such gases by entrainment in a body of scrubbing liquid can be prevented from forming an accumulative deposit by maintaining the body of scrubbing liquid in substantially continuous motion throughout the apparatus.

Another specific object of this invention is to provide a new and improved apparatus and method for treatment of gases, such apparatus having a cleaning portion and mist eliminating portion whereby entrained finely divided solid particles which are carried over into the mist eliminating portions are removed therefrom by continuously draining the mist eliminating portion into the cleaning portion of the apparatus.

Another specific object of this invention is to provide a new and improved apparatus and method for treatment of gases, such apparatus being separated into a cleaning portion and a mist eliminating portion by a water leg gas lock through which entrained finely divided solid particles which are carried over into the mist eliminating portion are removed therefrom by continuously draining the mist eliminating portion through such gas lock into the cleaning portion of the apparatus.

Another specific object of this invention is to provide a new and improved apparatus and method for treatment of gases, such apparatus having a cleaning portion and a mist eliminating portion, whereby entrained finely divided solid particles which are carried over into the mist eliminating portion are removed therefrom by continuous exterior draining of the separated mist from an inclined floor of the mist eliminating portion.

These and other objects of the present invention will become more apparent upon consideration of the detailed description of preferred embodiments of the instant invention taken in conjunction with the following drawings in which:

FIGURE 1 is a side elevational view, partly in section, of a gas treatment apparatus constructed in accordance with the principles of this invention, and FIGURE 2 is a side elevational view of another embodiment of a gas treatment apparatus constructed in accordance with the principles of this invention.

Referring to FIGURE 1, there is shown a formed closed housing 6 having a forward portion and a rearward portion hereinafter to be referred to as the splash tank 10 and the back bay 12, respectively. The housing 6 has vertical sides 11, a vertical forward wall 13 and a vertical rearward wall 38. The splash tank 10 being of relatively greater vertical dimension than the back bay 12 has a bottom element 14 sloping forwardly and downwardly and a vertical rearward wall 17 upwardly extending from the rearward edge of the bottom element 14 to the forward edge of the forwardly and downwardly sloping bottom element 36 of the back bay 12, the bottom element 36 extending rearwardly to the rearward wall 38. The splash tank 10 holds a body of scrubbing liquid 16 having a normal, non-operating, pre-selected, top surface level 15 and the liquid 16 being prevented from rising above this level by a suitable overflow type connection 18 which communicates with the bottom of the splash tank 10 through its forward wall 13 and is connected to a suitable waste disposal means such as a sewer or the like. A suitable tubing 18' communicates with the upper portion of the overflow connection 18 and the upper portion of the splash tank 10 through the forward wall 13 to form a gas lock release which prevents siphoning of the scrubbing liquid. The back bay 12 and the splash tank 10 have a common forwardly and downwardly sloping roof element 26 through which there is introduced, into a central area of the splash tank, a gas inlet conduit 20 having a vertical downwardly tapering portion 28 terminating in an outlet opening 22 upwardly adjacent the upper surface 15 of the body of scrubbing liquid 16. Within the vertical portion 28 of the gas inlet conduit 20 is an upwardly tapering frusto-conical throttle element 24 upwardly and downwardly adjustable to vary the size of an annular opening 23 formed between the throttle element 24 and the outlet opening 22 of the gas inlet conduit 20. A flat plate baffle element 8, vertically disposed, is rigidly secured to the side walls 11 of the housing 6, extending therebetween, and spaced downwardly from the roof element 26 so that a space 30 is formed between an upper edge 32 of the baffle element 8 and the roof element 26. The bottom edge 43 of the baffle element 8 is extended below the liquid livel 15, the baffle element 8 being spaced forwardly from the rearward wall 17 of the splash tank 10 to form an opening 39 and a water leg gas lock 41, therebetween, for a purpose to be hereinafter described. The back bay 12 is provided with an inlet connection 40, through its back wall 38, connected to a source of scrubbing liquid such as water to form a shallow stream of liquid on the upper surface of the bottom element 36, continually draining through the opening 39 between the back wall 17 of the splash tank 10 and the baffle element 8. A second flat plate baffle element 34 rigidly secured to the sides of the housing 6 and extending therebetween extends downwardly and forwardly from the roof element 26 and has a lower edge 35 forming an opening 37 between the lower edge 35 and a mean level of the shallow stream of liquid on the bottom element 36 of the back bay 12. The baffle element 34 also forms an opening 33 between the bottom edge 35 of the baffle element 34 and the rear surface of the baffle element 8. The three openings 30, 33, 37 are of substantially equal area for a purpose to be hereinafter explained. A passageway defined between the baffle element 34 and the rearward wall 38 of the back bay 12 suitably communicates with a gas outlet conduit 42 through the upper rearward portion of the housing 6 suitably communicating with a gas disposal means such as a chimney or the like. For a more complete description of the splash tank 12 and associated parts such as the outlet connection 18 and the throttle element 24 reference may be made to the hereinabove cited U.S. Patent No. 2,621,754.

In operation, a stream of industrial fume or smoke containing finely divided solid particles, moves under pressure differential through the inlet conduit 20 into the splash tank 10. As the stream of gas passes through the vertical portion 28 and out through the annular opening 23 it is forced to pass through progressively smaller areas with consequent increased velocity due to the shape of the vertical section 28 and the interposition of the throttle element 24. As the stream of gas enters the splash tank 10 through the annular opening 23 at a velocity much greater than that velocity which it had in conduit 20 the dynamic pressure of the stream of gas depresses the surface of the body of liquid 16 until the central portion of its surface area, immediately downwardly adjacent the outlet opening 22, is substantially depressed below the level of the surrounding liquid. The static pressure of the higher portion of the body of liquid constitutes a reaction against the pressure of the gas stream and induces a reversal in the direction of motion thereof. Hence the stream of gas is turned upwardly and the gas travels to and along the underside of the roof element 26, through the opening 30 until it impinges on the baffle element 34. The impingement of the gas stream against the baffle element 34 causes it to change direction and travel downwardly through the opening 33, where it is turned rearwardly through the opening 37, by the floor 36, and again upwardly through the passage defined by the baffle element 34 and the rearward wall 38 and out through the outlet conduit 42 to a suitable gas disposal means (not shown). To return to the action in the splash tank, as the incoming gas stream impinges upon the scrubbing liquid in the splash tank, the dynamic pressure of the gas stream changes the scrubbing liquid from the static defined surface shown as 15 to an indefinable condition where the upper part of the scrubbing liquid is filled with gas bubbles and no steady surface condition exists. It may be said that the scrubbing liquid tends to assume a shape such as shown by dashed line 21 although the effective level of the liquid controlled by the height of the outlet connection 18, remains substantially at the level indicated by the dashed line 15. The excess scrubbing liquid normally above dashed line 21 is now dispersed as droplets throughout the remaining volume of the splash tank 10. These droplets are carried over baffle element 8, through opening 30, and into the back bay 12 where the droplets are removed from the gas stream to coalesce and drain away through gas lock 41 in opening 39. It will be appreciated that the lower edge 43 of the baffle element 8 must be positioned lower relative to the level 15 than would be any portion of the dashed line 21 where it impinges on the baffle element 8 in order to maintain the water leg gas lock 41 in opening 39. The lower edge 43 of baffle element 8 must also be low enough that gas bubbles may not pass under the lower edge 43 and escape up through the gas lock 41 to bypass the normal path of the gas stream over baffle element 8 and through opening 30 to the back bay 12. The pressure in the back bay, being that of a downstream portion of the gas stream, is somewhat less than the pressure in the splash tank 10 and this difference in pressure maintains the height of the top surface of the water leg gas lock 41 above the dashed line 21, which height determines the allowable minimum elevation of the forward edge of the bottom element 36, of the back bay 12, above the rearward edge of the bottom element 14 of the splash tank 10. Scrubbing liquid being continuously added through the inlet 40 through the rearward wall 38 of the back bay 12 forms a shallow stream of liquid on the floor of the back bay 36. The floor 36 of the back bay 12 sloping slightly forwardly and downwardly continually drains the scrubbing liquid into the opening 39 and maintains the volume of the body of scrubbing liquid 16 which is being continuously drained through the outlet connection 18. Some of the scrubbing liquid is vaporized and carried off by the gas stream, which may reach saturation, this loss of scrubbing liquid must be made up by addition of liquid through the inlet 40.

When the stream of gas from the annular opening 23 impinges upon the surface of the liquid body 16 a great deal of splashing results which causes the formation of a multiplicity of small droplets of liquid intermingling with the gas stream. These droplets from an efficient cleaning agent and envelop the entrained solid particles in the gas stream. These droplets enveloping the solid particles are carried oven into the back bay 12 in the gas stream through the opening 30 and passes through the successive openings 33 and 37. The centrifugal force applied to these droplets enveloping the solid particles, added to the gravitational force, causes the droplets enveloping the solid particles to settle out on the floor 36 of the back bay 12 where they coalesce and join the stream of liquid on the floor of the back bay 12 and are drained through the opening 39 into the splash tank 10. It will be noted that the openings 30, 33 and 37, being of substantially equal area, maintain the velocity of the gas stream at a substantially constant value to prevent the gas stream from picking up any liquid from the floor of the back bay 12. Wet gas stream from opening 30 impinges on baffle element 34 and liquid coalesces on 34, runs down 34 and drips off of bottom edge 35. The gas stream at 37 must be slow enough not to pick up water drops crossing gas stream from bottom edge 35 to floor 36. After passing the opening 37 the gas stream carries only that moisture which exists as vapor in the gas stream. The solid particles formerly entrained in the gas stream having been removed therefrom and deposited in a shallow stream of liquid do not settle out in the back bay 12 but are transported in the moving liquid into the splash tank 10 where the agitation due to the entering gas stream also keeps them in suspension until they pass out through the outlet connection 18 and are disposed of in the suitable waste connection. The stream of gas having been cleansed of its entrained solid particles passes out through the outlet conduit 42 and may be disposed of in any suitable manner.

There is shown in FIG. 2 a second embodiment of this invention wherein parts identical with those shown in the embodiment of FIG. 1 have been identified with the same numbers while those parts which are similar in form and function to those of the first embodiment are identified by the same numeral primed. The splash tank 10' of the container 6' differs from the splash tank 10 heretofore described only in that a scrubbing liquid inlet 40' communicates directly with the splash tank 10' through its rear wall 17' or any other suitable location rather than through the back bay 12 as was the case in the embodiment of FIG. 1. The baffle element 8' differs from the baffle 8 in that its lower portion abuttingly engages the upper portion of the rear wall 17' of the splash tank 10' and can be an integral part thereof as shown. The back bay 12' differs from the back bay 12 hereinabove described in that its bottom element 36' slopes rearwardly and downwardly and the rearward wall 38' is provided in its lower portion with an outlet connection 44, for scrubbing liquid, which terminates in a water leg gas lock 46, of a type well known in the art, which in turn suitably communicates with a suitable waste outlet 48. The gas lock 46 forms a gas seal for the liquid outlet connection 44. The structure of the embodiment illustrated in FIG. 2 being otherwise the same as that of the embodiment of FIG. 1, it will not be described.

The operation of the embodiment shown in FIG. 2 is in all respects the same as that hereinabove described except that the make up liquid being supplied through the inlet connection 40' is added directly to the splash tank 10' and that a shallow stream of liquid on the bottom element 36' is formed by the coalescing of the droplets of the liquid spray which have been separated from the gas stream, as it progresses through the equal openings 30, 33 and 37, in the same manner as hereinbefore described. This stream of liquid is continuously drained through outlet opening 44, located upwardly adjacent the upper surface of bottom element 36', into the gas lock 46' where the entrained solid particles, removed from the stream of gas, and the effluent liquid are drained through a suitable waste connection 48 to a suitable place of disposal.

In both embodiments the provision of continuous draining for the back bay area constitutes a significant advance in the art and markedly increases the cleaning efficiency of this device, over those of the prior art.

In either embodiment of this invention the bottom end 22 of nozzles 28 may be closer to bottom of splash tank 10 than was possible under earlier patents, and will allow a lower static liquid level 15 with a resultant decrease in the volume of liquid needed in splash tank 10. This increases the scrubbing action, improves the efficiency, and would also allow a more compact unit—particularly in the use of the back bay 12' of FIG. 2. Previous patents required a deep liquid bath because the liquid level in the back bay 12 was determined by the liquid level in the splash tank 10 which level was relatively high in order to maintain the gas lock.

It is to be noted that the base portion 36 of the back bay 12 (FIG. 1) could be given a reverse slope as shown in FIG. 2 for the bottom element 36' and provided with a drain such as 44. If the upper edge 19 of the back wall 17 were located at approximately the height of the level 15 then the reverse slope bottom element such as 36' could act as the overflow element with the elimination of the overflow connection 18 since the water level in the sump would be controlled by the overflow through the back bay. In such case the inlet connection 40 would communicate directly with sump 16 as shown in FIG. 2.

It is further to be noted with respect to the embodiment of FIG. 2 that the height at which the bottom element 36' is located bears no definite relationship to the level 15 since communication with the sump 16 is prevented by the wall 17'. It is therefore possible that the bottom element 36' might well be located below the level 15 without interfering with the desired action of the back bay 12'. As long as direct communication between the sump 16 and the back bay 12' at any point below the upper edge 32 is prevented, the structure will operate as described for FIG. 2.

Having described preferred embodiments of this invention, it is to be realized that modifications thereof may be made without departing from the broad spirit and scope of the invention. Accordingly, it is respectfully requested that the claims appended hereto be interpreted as broadly as possible and be limited only by the prior art.

What is claimed is:

1. Apparatus for recovering foreign particles entrained in a gaseous stream comprising, a space enclosing housing having a roof portion and vertically displaced base portions, a wall portion extending vertically and laterally through an interemediate portion of the space enclosed within said housing with the lower edge thereof spaced above the lower of said base portions and below the upper of said base portions of said housing so as to define first and second compartments within said housing said upper base portion being the base of said second compartment, said wall portion having the upper edge thereof spaced from said roof portion so as to define a single gas flow opening therebetween, said first compartment having said lower base portion and wall portions defining a sump, means for maintaining the level of a liquid in said sump below the level of the base of said second compartment, means within said first compartment for introducing such a gaseous stream having foreign particles entrained therein into said sump, means depending from said roof portion of said second compartment in lateral spaced relationship to said intermediate wall portion so as to define a second opening between the lower edge thereof and said base of said second compartment, said first mentioned and said second openings and the smallest opening defined by said intermediate wall portion and said depending means having substantially equal cross sectional areas, and gas outlet means spaced upwardly of the base of said second compartment on the side of said depending means opposite from said first mentioned opening.

2. Apparatus for separating foreign particles entrained in a gaseous stream from such stream comprising; a space enclosing housing having a roof portion and vertically displaced higher and lower base portions, a wall portion extending vertically and laterally through an intermediate portion of the space enclosed within said housing with the upper edge thereof spaced from said roof portion so as to define first and second compartments with a gas flow opening above said wall portion communicating between said first and second compartments and the bottom edge of said wall portion spaced below the lower edge of said higher base portion, said first compartment having said lower base portion and wall portions defining a sump located below said lower edge of said higher base portion, said higher base portion being the base of said second compartment and inclined downwardly towards said sump, means for introducing a liquid into said second compartment along the higher edge of said higher base portion, means for limiting the height of such liquid in said sump to a level below the level of said lower edge and above the level of said bottom edge, means within said first compartment for introducing such a gaseous stream having foreign particles entrained therein, means located within said second compartment laterally spaced from said intermediate wall portion and depending from the roof portion thereof defining a gas flow opening between the lower edge portion thereof and said higher base portion, and gas outlet means located at least adjacent the roof portion of said second compartment on the side of said depending means opposite said first mentioned opening.

3. Apparatus for separating foreign particles entrained in a gaseous stream from such stream comprising; a space enclosing housing having a roof portion and vertically displaced base portions, a wall portion extending vertically and laterally through an intermediate portion of the space enclosed within said housing with the lower edge thereof spaced above the lower base portion and below the upper base portion of said housing so as to define first and second compartments within said housing said wall portion having the upper edge thereof spaced from said roof portion so as to define a single gas flow opening therebetween, said first compartment having the lower of said base portions and wall portions defining a sump, means for maintaining the level of a liquid in said sump below the level of the higher of said base portions and above said lower edge, said higher base portion being the base of said second compartment, means within said first compartment for introducing such a gaseous stream having foreign particles entrained therein into said sump, means for introducing a liquid onto said base of said second compartment, means depending from said roof portion of said second compartment in lateral spaced relationship to said intermediate wall portion so as to define a second opening between the lower edge thereof and said base of said second compartment, and gas outlet means spaced upwardly of the base portion of said second compartment on the side of said depending means opposite from said first mentioned opening.

4. Apparatus for separating foreign particles entrained in a gas stream from such gas stream comprising; a space enclosing housing having a roof portion and base portions, a dividing wall extending vertically and laterally through an intermediate portion of the space enclosed within such housing to define first and second compartments said intermediate wall being spaced from said roof portion to provide a single opening therebetween for communication between said first and second compartments, said first compartment having an inclined base portion and wall portions defining a sump having a body of liquid therein, said second compartment having an inclined base portion extending downwardly away from said dividing wall, gas locked drain means communicating with the lowest portion of said inclined base portion of said second compartment, means for introducing additional amounts of said liquid into said sump, gas locked means for limiting the maximum level of the liquid in said sump, means within said first compartment for introducing such a gaseous stream having foreign particles entrained therein into said sump, means depending from said roof portion of said second compartment in laterally spaced relation to said intermediate wall portion so as to define a second opening between the lower edge portion thereof and said intermediate wall, and defining a third opening between the lower edge portion thereof and said base portion of said second compartment, and gas outlet means spaced upwardly of said base portion of said second compartment on the side of said depending means opposite said first mentioned opening.

References Cited

UNITED STATES PATENTS

| | | | |
|---|---|---|---|
| 1,684,068 | 9/1928 | Moon | 55—247 X |
| 1,793,460 | 2/1931 | Binkley | 55—328 X |
| 2,621,754 | 12/1952 | Doyle | 55—7 |
| 2,720,280 | 10/1955 | Doyle | 55—95 X |

FOREIGN PATENTS 1,098,364  3/1955  France.

SAMIH N. ZAHARNA, *Primary Examiner.*

REUBEN FRIEDMAN, *Examiner.*

J. ADEE, *Assistant Examiner.*